United States Patent
Okazaki et al.

(10) Patent No.: US 10,184,451 B2
(45) Date of Patent: Jan. 22, 2019

(54) WIND-POWERED THERMAL POWER GENERATION SYSTEM

(71) Applicant: Sumitomo Electric Industries, Ltd., Osaka-shi, Osaka (JP)

(72) Inventors: Toru Okazaki, Osaka (JP); Taketsune Nakamura, Kyoto (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 21 days.

(21) Appl. No.: 14/416,181

(22) PCT Filed: Jul. 12, 2013

(86) PCT No.: PCT/JP2013/069164
§ 371 (c)(1),
(2) Date: Jan. 21, 2015

(87) PCT Pub. No.: WO2014/017320
PCT Pub. Date: Jan. 30, 2014

(65) Prior Publication Data
US 2015/0192109 A1    Jul. 9, 2015

(30) Foreign Application Priority Data
Jul. 26, 2012 (JP) .................................. 2012-166322

(51) Int. Cl.
*F03D 9/00* (2016.01)
*F03D 9/25* (2016.01)
(Continued)

(52) U.S. Cl.
CPC ................. *F03D 9/25* (2016.05); *F03D 9/00* (2013.01); *F03D 9/18* (2016.05); *F03D 9/22* (2016.05); *Y02E 10/725* (2013.01)

(58) Field of Classification Search
CPC . F03D 9/00; F03D 9/006; F03D 9/002; Y02E 10/725
(Continued)

(56) References Cited

U.S. PATENT DOCUMENTS

| 4,039,909 | A | * | 8/1977 | Baker | .................... H02K 19/26 318/732 |
| 5,477,163 | A | * | 12/1995 | Kliman | ................ G01R 31/346 318/434 |

(Continued)

FOREIGN PATENT DOCUMENTS

| CN | 2556381 Y | 6/2003 |
| CN | 102270895 A | 12/2011 |

(Continued)

*Primary Examiner* — Viet Nguyen
(74) *Attorney, Agent, or Firm* — Drinker Biddle & Reath LLP

(57) ABSTRACT

In a wind-powered thermal power generation system, an induction motor includes a field (rotor) which has a field core coupled to a rotation shaft of the wind turbine and a field conductor, and an armature (stator) which has an armature core arranged on the outer side of the field with a spacing therebetween and an armature winding, and the induction motor is housed in the heat insulating container. A heating medium circulation mechanism circulates, inside the heat insulating container, a heating medium that receives heat generated by the induction motor. A magnetic field control means controls an input current to the armature winding so as to result in slip that produces load torque at the rotor rotating due to rotation of the wind turbine. A power generation portion converts, into electricity, the heat of the heating medium heated by the induction motor.

3 Claims, 5 Drawing Sheets

(51) Int. Cl.
*F03D 9/18* (2016.01)
*F03D 9/22* (2016.01)

(58) Field of Classification Search
USPC .................................................. 290/44, 55
See application file for complete search history.

(56) References Cited

U.S. PATENT DOCUMENTS

| | | | | |
|---|---|---|---|---|
| 6,310,417 | B1* | 10/2001 | Hsu .................. | H02K 17/24 |
| | | | | 310/112 |
| 2011/0084566 | A1* | 4/2011 | Nakamura ............ | H02K 55/04 |
| | | | | 310/162 |
| 2012/0193924 | A1* | 8/2012 | Okazaki .................. | F03D 9/006 |
| | | | | 290/55 |
| 2013/0069492 | A1* | 3/2013 | Rippel .................... | H02J 7/045 |
| | | | | 310/68 D |
| 2013/0076174 | A1 | 3/2013 | Wibben et al. | |
| 2014/0110938 | A1* | 4/2014 | Okazaki .................. | F03D 9/006 |
| | | | | 290/2 |
| 2016/0201650 | A1* | 7/2016 | Okazaki .................. | F03D 9/002 |
| | | | | 290/44 |
| 2016/0252076 | A1* | 9/2016 | Okazaki .................... | F03D 9/22 |

FOREIGN PATENT DOCUMENTS

| | | |
|---|---|---|
| CN | 102575648 A | 7/2012 |
| CN | 103621176 A | 3/2014 |
| JP | S57-131875 A | 8/1982 |
| JP | 2010-130839 A | 6/2010 |
| JP | 2010-272669 A | 12/2010 |
| JP | 2011-102576 A | 5/2011 |
| JP | 2011-159468 A | 8/2011 |
| JP | 2011-236790 A | 11/2011 |
| JP | 2012-043728 A | 3/2012 |
| JP | 2012-112296 A | 6/2012 |
| WO | WO-2011/045999 A1 | 4/2011 |

* cited by examiner

200: 210, 220
210: 211, 215
220: 221, 225

WIND-POWERED THERMAL POWER GENERATION SYSTEM

TECHNICAL FIELD

The present invention relates to a power generation system, and particularly to a wind-powered thermal power generation system that uses wind power to generate heat and converts the heat into electricity to generate power.

BACKGROUND ART

In recent years, power generation systems using renewable energy have been attracting attention. As one of these systems, a wind power generation system that converts rotational energy of a wind turbine into electrical energy by a power generator has been known.

In response, there has been proposed a wind-powered thermal power generation system that converts rotational energy of a wind turbine into thermal energy by a heat generator using heat generation by induction heating (eddy current), and converts the heat into electrical energy (refer to, for example, Japanese Patent Laying-Open No. 2011-102576 (PTD 1) and Japanese Patent Laying-Open No. 2012-43728 (PTD 2)).

CITATION LIST

Patent Document

PTD 1: Japanese Patent Laying-Open No. 2011-102576
PTD 2: Japanese Patent Laying-Open No. 2012-43728

SUMMARY OF INVENTION

Technical Problem

However, in the wind-powered thermal power generation system described in PTDs 1 and 2, it is necessary to design, from the beginning, the heat generator which is a component, and thus, rising cost is a concern.

The present invention has been made in view of the aforementioned circumstances, and one object of the present invention is to provide a wind-powered thermal power generation system in which a heat generator is formed by using the existing technique and thus the heat generator can be formed inexpensively and simply.

Solution to Problem

The inventors of the present invention applied the existing technique of an induction motor (e.g., canned motor) to a heat generator and devised an operation method (control) of the induction motor in a wind-powered thermal power generation system. Thus, the inventors of the present invention completed the present invention.

A wind-powered thermal power generation system according to the present invention includes: a wind turbine; an induction motor; a heating medium circulation mechanism; magnetic field control means; and a power generation portion. The induction motor includes a field which has a field core and a field conductor arranged therearound, and an armature which has an armature core provided with a salient pole facing the field and an armature winding wound around the salient pole. One of the field and the armature serves as a rotor coupled to a rotation shaft of the wind turbine, and the other serves as a stator. The heating medium circulation mechanism circulates a heating medium that receives heat generated by the induction motor. The magnetic field control means controls an input current to the armature winding so as to result in slip that produces load torque at the rotor rotating in conjunction with the rotation shaft, when the wind turbine is rotating by wind. The power generation portion converts, into electricity, the heat of the heating medium heated by the induction motor.

According to the wind-powered thermal power generation system of the present invention, the technique of the induction motor is applied to the heat generator, and thus, the heat generator can be formed inexpensively and simply. With the wind turbine rotating by wind and the rotor (one of the field and the armature) of the induction motor rotating, the magnetic field control means controls the input current to the armature winding so as to result in slip that produces the load torque, and thereby, the rotational speed of a magnetic field generated at the armature is adjusted. As a result, the load torque is forcibly provided to the rotor and an induced current corresponding to the load torque flows through the field conductor of the field, and thus, the field conductor generates heat. Namely, a workload (output) caused by the load torque that prevents the rotation of the rotor is converted into heat as a loss. In addition, the heating medium circulation mechanism circulates the heating medium, and thereby, the induction motor (field) that generated heat can be cooled and it is also possible to prevent the field conductor, the armature winding and the like from being burnt. A value of the input current to the armature winding may be determined as appropriate in accordance with the specifications of the induction motor such that prescribed load torque is obtained, and the value of the input current may be set at, for example, the same current value as a rated current (design value). As the value of the input current to the armature winding becomes larger, the load torque becomes larger in principle. However, if the input current value is too large, the armature core is magnetically saturated, and thus, the load torque plateaus. It is conceivable to set the value of the input current to the armature winding at, for example, 50% or more and 110% or less of the rated current.

Generally, an induction motor includes a primary side armature winding to which a current is supplied from outside, and a secondary side conductor (e.g., squirrel-cage conductor) that is not electrically connected to the outside and has short-circuited opposing ends. Here, this secondary side substantially functions as a field, and thus, the secondary side is called "field", and a core and a conductor on the secondary side are expressed as "field core" and "field conductor", respectively, in the present invention. By adjusting a phase of the armature with the induction motor rotating, the induction motor also serves as a power generator. Basically, in the present invention, the induction motor operating in the power generator mode (the state in which the induction motor is rotating at the rated rotational speed or higher speed) is controlled.

In the wind-powered thermal power generation system according to the present invention, the magnetic field control means may apply a direct current to the armature winding.

FIG. 7 is a view showing one example of the speed-torque characteristics of a typical induction motor. As shown in FIG. 7, the starting torque of the induction motor is usually larger than the rated torque when the induction motor provides a rated output. An output of the induction motor is proportional to a product of the rotational speed (the number of rotations) and the torque. When the magnetic field control means applies the direct current to the armature winding during rotation of the rotor at the rated rotational speed (the rated number of rotations) due to rotation of the wind turbine, the rotational speed of the magnetic field generated at the armature becomes zero and the same phenomenon as the principle called dynamic brake occurs. Assuming that the rotor is stationary and the stator is relatively rotating, this is the same situation as a situation in which slip becomes 100% and the induction motor is started up. As a result, the same amount of load torque as the amount of starting torque is produced and the induced current flows through the field conductor of the field, and thus, a workload (output) thereof is consumed as heat generation by the field conductor. Namely, by applying the direct current to the armature winding, the same torque as the starting torque can be output and the workload (output) larger than the rated output of the induction motor can be obtained. Therefore, when the induction motor having the same output as that of the conventional power generator (motor) is used as the heat generator, the heat generator can be reduced in size and weight as compared with the power generator.

In the wind-powered thermal power generation system according to the present invention, the magnetic field control means may apply, to the armature winding, an alternating current having a frequency that produces stalling torque.

As shown in FIG. 7, the stalling torque is the maximum torque that can be output by the induction motor, and is further larger than the rated torque and the starting torque. When the magnetic field control means applies, to the armature winding, the alternating current having a frequency that produces the stalling torque during rotation of the rotor at the rated rotational speed (the rated number of rotations) due to rotation of the wind turbine, larger workload (output) can be obtained. Specifically, the frequency of the alternating current applied to the armature winding is controlled so as to result in slip that produces the stalling torque, and the rotational speed of the magnetic field generated at the armature is adjusted. As a result, the same amount of load torque as the amount of stalling torque is produced and larger induced current flows through the field conductor of the field, and thus, a workload (output) thereof is consumed as heat generation by the field conductor. Therefore, when the induction motor having the same workload (output) as that of the conventional power generator (motor) is used as the heat generator, the heat generator can be reduced in size and weight as compared with the power generator.

The wind-powered thermal power generation system according to the present invention may further include a heat insulating container that houses the induction motor, wherein the heating medium circulation mechanism may circulate the heating medium inside the heat insulating container.

According to this configuration, even when the field that generates heat is a rotor, the heat generated by the field can be easily transferred to the heating medium.

Advantageous Effects of Invention

According to the wind-powered thermal power generation system of the present invention, the heat generator which is a component is formed by using the technique of the induction motor, and thus, the heat generator can be formed inexpensively and simply.

DESCRIPTION OF EMBODIMENTS

Figure 1:
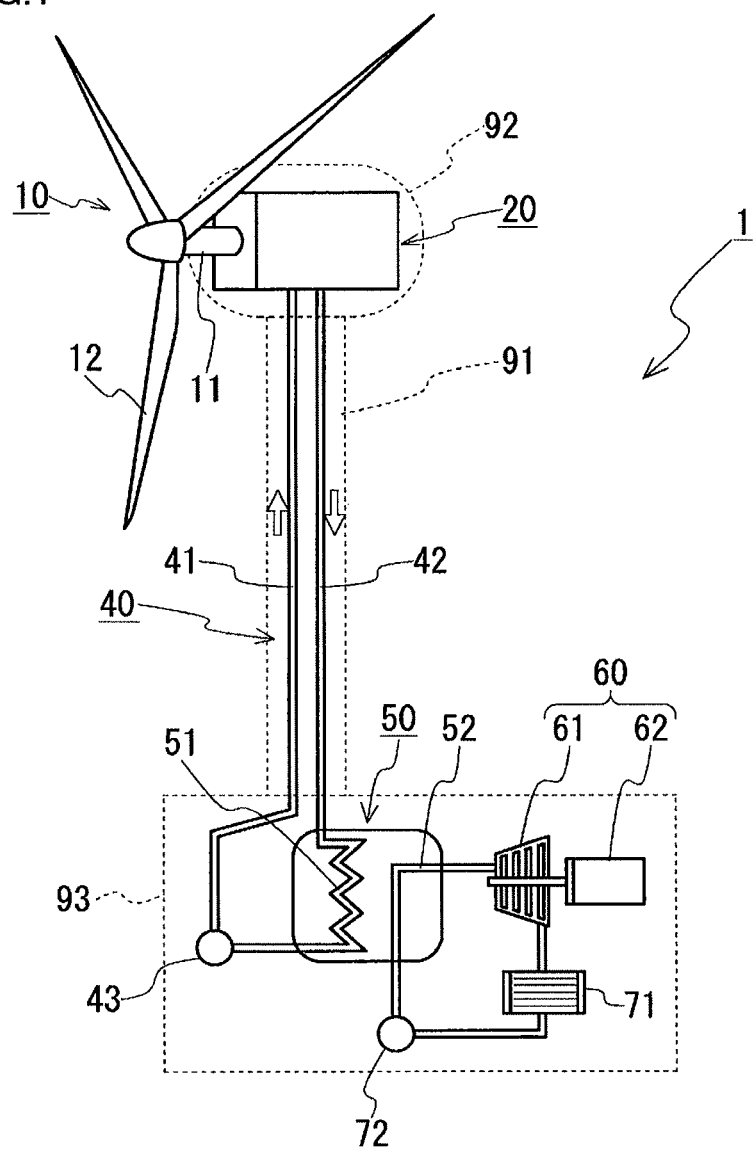
FIG. 1 is a schematic view showing one example of an overall configuration of a wind-powered thermal power generation system according to the present invention.

Embodiments of the present invention will be described with reference to the drawings. In the drawings, the same or corresponding portions are denoted by the same reference characters.

First Embodiment: Field=Rotor (Inner Side), Armature=Stator (Outer Side)

A wind-powered thermal power generation system according to a first embodiment of the present invention will be described with reference to FIGS. 1 to 4. A wind-powered thermal power generation system 1 shown in FIG. 1 includes a wind turbine 10, a heat generator 20, a heating medium circulation mechanism 40, a heat exchanger 50, and a power generation portion 60. Heat generator 20 includes an induction motor 200, a heat insulating container 250 and magnetic field control means 30 (see FIG. 2). In this example, as shown in FIG. 1, wind turbine 10 is attached to a nacelle 92 set up on the top of a tower 91, and heat generator 20 is housed in nacelle 92. Heat exchanger 50 and power generation portion 60 are set up in a building 93 built on the bottom (base) of tower 91.

Wind turbine 10 has such a structure that three blades 12 are radially attached to a horizontally extending rotation shaft 11, with rotation shaft 11 being a center. A rotation detector 13 (see FIG. 2) for detecting the rotational speed (the number of rotations) is attached to rotation shaft 11 of wind turbine 10.

Heat generator 20 is formed by using the existing induction motor (canned motor used in a high-temperature pump). In this example, induction motor 200 is a three-phase squirrel-cage induction motor, and includes a field 210 and an armature 220 that face each other with a spacing therebetween. Induction motor 200 has such a structure that field 210 serves as a rotor and armature 220 serves as a stator. Induction motor 200 includes field 210 and armature 220 spaced apart from this field 210, and field 210 serves as a rotor coupled to rotation shaft 11 of wind turbine 10 and armature 220 serves as a stator. Specifically, field (rotor) 210 has a field core 211 coupled to rotation shaft 11 of wind turbine 10, and a field conductor 215 arranged therearound. Field 210 rotates due to rotation of wind turbine 10. Armature (stator) 220 has an armature core 221 arranged on the outer side of field 210 with a spacing therebetween and having a salient pole that faces field 210, and an armature winding 225 wound around the salient pole. In this example, field 210 of induction motor 200 is directly coupled to rotation shaft 11 of wind turbine 10. However, field 210 may be coupled to an output shaft of a speed-increasing machine through the speed-increasing machine. In the case of not using the speed-increasing machine, trouble caused by the speed-increasing machine can be avoided.

In field (rotor) 210, a conductor is arranged in the form of squirrel cage around cylindrically-shaped field core 211 and this squirrel-cage conductor forms field conductor 215. This squirrel-cage conductor (field conductor 215) is formed by embedding conductor bars 215b in multiple slots spaced apart from one another and provided in an outer circumference of field core 211, and providing, at opposing ends of field core 211, conductor end rings 215r for short-circuiting these conductor bars 215b. Such squirrel-cage rotor has advantages such as extremely simple structure and little failure. In this example, the squirrel-cage rotor is used in which the squirrel-cage conductor is used as field conductor 215. However, a wound rotor may be used in which a winding having a conductor wound therearound and having short-circuited opposing ends is used as field conductor 215. Field core 211 can be formed by stacking electromagnetic steel plates such as, for example, silicon steel plates. Field conductor 215 may be made of, for example, copper or aluminum.

In armature (stator) 220, three-phase (U-phase, V-phase and W-phase) armature winding 225 is wound around the salient pole of armature core 221 in the form of distributed winding. In this example, armature core 221 is configured to have a cylindrical yoke portion and the salient pole protruding inwardly from this yoke portion toward field 210. Although armature winding 225 is wound in the form of distributed winding, armature winding 225 can also be wound in the form of concentrated winding, and a single-phase or two-phase winding may be used in addition to the three-phase winding. Armature core 221 can be formed by stacking electromagnetic steel plates such as, for example, silicon steel plates. Since armature winding 225 is used under the high-temperature environment in which armature winding 225 is arranged in a heating medium 400 whose temperature becomes high, a super heat-resistant winding having, for example, a ceramic insulating layer is preferably used. As the super heat-resistant winding, a heat-resistant winding that can be used at a temperature up to 400° C. is known. As a matter of course, when armature winding 225 is used at low temperature, an enamel wire such as a polyamide-imide copper wire or a polyimide copper wire can also be used.

Heat insulating container 250 houses induction motor 200 (field (rotor) 210 and armature (stator) 220). Heat insulating container 250 may be configured, for example, by arranging a heat insulating material around a container made of metal. Rock wool, glass wool, foamed plastic, brick, ceramic or the like can, for example, be used as the heat insulating material.

Heat insulating container 250 is provided with a shaft insertion port 253 through which rotation shaft 11 is inserted, and rotation shaft 11 is coupled to field (rotor) 210 of induction motor 200 through this shaft insertion port 253. In this example, a central shaft of field core 211 is provided with a through hole and rotation shaft 11 is inserted into this through hole, such that field 210 is fixed to rotation shaft 11. Inside heat insulating container 250, bearings 261 and 262 are provided at two places, i.e., on a side where rotation shaft 11 is inserted and a side opposite to this side. Rotation shaft 11 is rotatably supported by these bearings 261 and 262.

Heat insulating container 250 is also provided with an inlet 251 through which heating medium 400 is supplied, and an outlet 252 from which heating medium 400 is discharged, and heating medium 400 that receives heat generated by induction motor 200 is circulated. In this example, inlet 251 is provided on the side of heat insulating container 250 where rotation shaft 11 is inserted, and outlet 252 is provided on the opposite side. A supply pipe 41 and a discharge pipe 42 of heating medium circulation mechanism 40 are connected to inlet 251 and outlet 252, respectively. In addition, a shaft seal portion 263 is arranged at shaft insertion port 253 of heat insulating container 250. The temperature of heating medium 400 supplied from inlet 251 into heat insulating container 250 is preferably set at 100° C. or lower (e.g., ordinary temperature), and thus, induction motor 200 (field 210) that generated heat can be effectively cooled. Since the temperature of heating medium 400 is set at 100° C. or lower, it is only necessary for shaft seal portion 263 arranged near inlet 251 to have a heat resistance of approximately 100° C., and a commercially available fluid seal can be used in shaft seal portion 263. Heating medium 400 that received the heat generated by induction motor 200 and was heated to a prescribed temperature (e.g., 200° C. to 350° C.) is discharged from outlet 252 to the outside of heat insulating container 250.

Water, oil, molten salt or the like can, for example, be used as heating medium 400. When water is used as heating medium 400, the water is vaporized when the temperature of the water exceeds 100° C. Therefore, when heating medium 400 is heated to a temperature exceeding 100° C., the internal pressure of heat insulating container 250 increases. On the other hand, when oil or molten salt having a boiling point exceeding 100° C. at ordinary pressure is used as heating medium 400, the increase in internal pressure of heat insulating container 250 can be suppressed even if heating medium 400 is heated to a temperature exceeding 100° C. Heating medium 400 preferably has a boiling point exceeding 200° C., and more preferably a boiling point exceeding 350° C., at ordinary pressure, and heating medium 400 is particularly preferably a liquid within the operating temperature range (e.g., from ordinary temperature to 350° C.). In this example, oil having a boiling point exceeding 350° C. at ordinary pressure is used as heating medium 400, and heating medium 400 is circulated inside heat insulating container 250 and the heating medium is heated to approximately 350° C. by induction motor 200.

Figure 3:
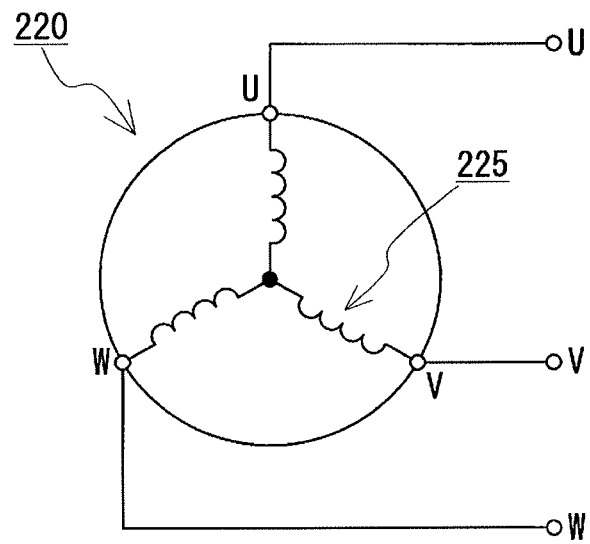
FIG. 3 is an explanatory view showing one example of connection of an armature winding in an armature.
Figure 4:
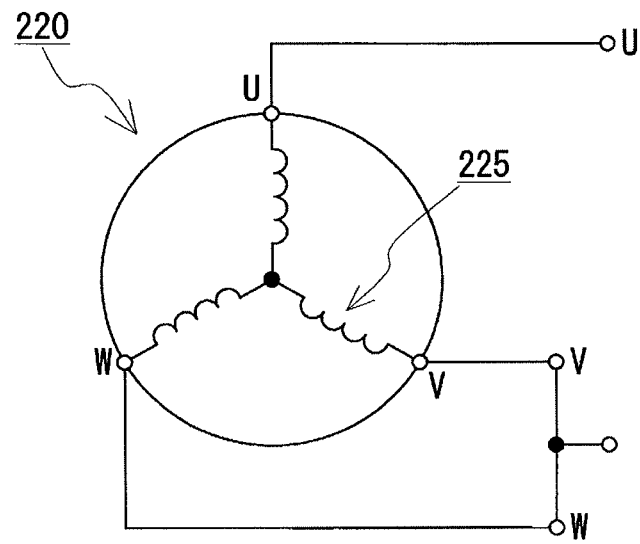
FIG. 4 is an explanatory view showing another example of connection of the armature winding.

During rotation of the rotor (here, field 210) due to rotation of wind turbine 10, magnetic field control means 30 controls an input current to armature winding 225 of induction motor 200 so as to result in slip that produces the load torque, and controls a magnetic field generated at the stator (here, armature 220). In this example, a power supply 310 for applying a direct current to armature winding 225 is connected to allow the direct current to flow through the two phases of the three phases of armature winding 225. Specifically, as shown in FIG. 3, the respective phases of armature winding 225 are connected in the form of Y-connection in armature 220, and the direct current is applied to between the U phase and the V phase, between the U phase and the W phase, or between the V phase and the W phase. A value of the input current to armature winding 225 is set at the same current value as the rated current (design value). Although the direct current is applied to the two phases of the three phases in this example, the direct current may be allowed to flow through the three phases. Specifically, as shown in FIG. 4, the two phases are short-circuited and the direct current is applied to between the remaining phase and these two phases (FIG. 4 shows a case in which the V phase and the W phase are short-circuited and the direct current is applied to between the U phase and the short-circuited V and W phases).

Figure 7:
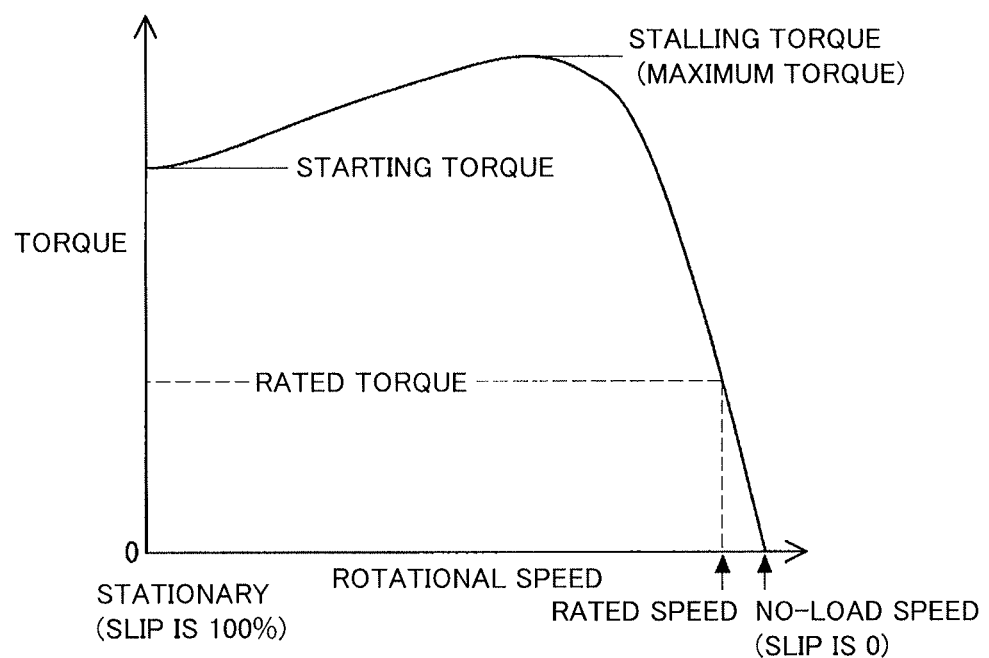
FIG. 7 is an explanatory view showing one example of the speed-torque characteristics of a typical induction motor.

The principle of induction motor 200 operating as a heat generator in this case will be described. For example, when magnetic field control means 30 applies the direct current to armature winding 225 in the case where field (rotor) 210 is rotating at the rated rotational speed (the rated number of rotations) due to rotation of wind turbine 10, the same amount of load torque as the amount of starting torque is produced. Then, an induced current flows through field conductor 215 of field 210 and a workload (output) thereof is consumed as heat generation by field conductor 215. As described above with reference to FIG. 7, the starting torque is generally larger than the rated torque, and thus, the workload (output) larger than the rated output of induction motor 200 can be obtained and an amount of heat generation is large.

Figure 2:
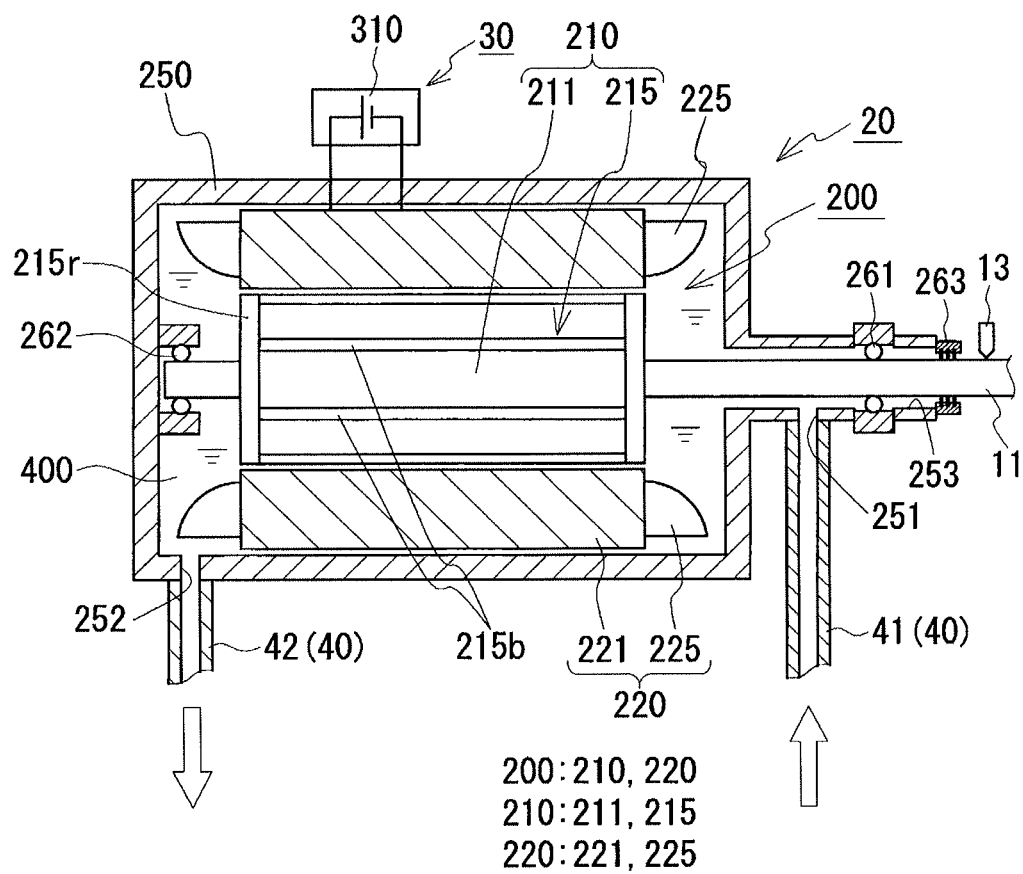
FIG. 2 is a schematic view showing one example of a configuration of a heat generator in a first embodiment.

Heating medium circulation mechanism 40 circulates, inside heat insulating container 250, heating medium 400 that receives the heat generated by induction motor 200 (see FIGS. 1 and 2). In this example, supply pipe 41 having one end connected to inlet 251 of heat insulating container 250, for supplying heating medium 400 into heat insulating container 250; discharge pipe 42 having one end connected to outlet 252 of heat insulating container 250, for discharging heating medium 400 to the outside of heat insulating container 250; and a circulating pump 43 provided in supply pipe 41 are provided. The other ends of supply pipe 711 and discharge pipe 42 are connected to heat exchanger 50, and heating medium 400 is circulated between heat generator 20 (heat insulating container 250) and heat exchanger 50 by circulating pump 43, such that heating medium 400 is circulated inside heat insulating container 250. It is preferable to adjust a flow rate of heating medium 400 by circulating pump 43, in accordance with the temperature of heating medium 400 heated by induction motor 200. Specifically, when the temperature of heating medium 400 is higher than the prescribed temperature, the flow rate of heating medium 400 is increased. When the temperature of heating medium 400 is lower than the prescribed temperature, the flow rate is decreased. As a result, induction motor 200 can be maintained within the operating temperature range.

Heating medium 400 heated by heat generator 20 (induction motor 200) is transmitted through discharge pipe 42 to heat exchanger 50. In this example, a heat storage material is filled into heat exchanger 50, and a first heat exchange pipe 51 and a second heat exchange pipe 52 are arranged inside heat exchanger 50. Discharge pipe 42 is connected to one end of first heat exchange pipe 51. Heating medium 400 heated to the prescribed temperature circulates through first heat exchange pipe 51, and thus, heat exchange is performed between heating medium 400 and the heat storage material, and the heat of heating medium 400 is stored in the heat storage material. On the other hand, a secondary heating medium (e.g., water) circulates through second heat exchange pipe 52, and thus, heat exchange is performed between the heat storage material and the secondary heating medium, and the secondary heating medium circulating through second heat exchange pipe 52 is vaporized. The generated steam (e.g., high-temperature and high-pressure steam) of the secondary heating medium is transmitted through second heat exchange pipe 52 to power generation portion 60. Namely, this heat exchanger 50 also has a function as a heat storage device. A latent heat storage material, a sensible heat storage material or the like can be used as the heat storage material, or they may be used in combination. Generally, the latent heat storage material involves the phase change between solid and liquid, and has a heat storage density higher than that of the sensible heat storage material. Supply pipe 41 is connected to the other end of first heat exchange pipe 51, and heating medium 400 subjected to heat exchange and cooled is again transmitted through supply pipe 41 to power generation portion 20 (heat insulating container 250) by circulating pump 43.

Power generation portion 60 converts, into electricity, the heat of heating medium 400 heated by heat generator 20 (induction motor 200). In this example, the heat stored in heat exchanger 50 is converted into electricity. Power generation portion 60 shown in FIG. 1 is configured to include a combination of a steam turbine 61 and a power generator 62, and steam turbine 61 is rotated by the steam supplied from heat exchanger 50 and power generator 62 is driven to generate power. By using the heat stored in heat exchanger 50 for power generation, stable power generation is possible even when the wind power varies.

The steam of the secondary heating medium discharged from power generation portion 60 (steam turbine 61) is cooled and returned to liquid by a condenser 71, and thereafter, is supplied to heat exchanger 50 (second heat exchange pipe 52) by a circulating pump 72. As a result, the secondary heating medium circulates between heat exchanger 50 and power generation portion 60.

Second Embodiment: Field=Rotor (Inner Side), Armature=Stator (Outer Side)

Figure 5:
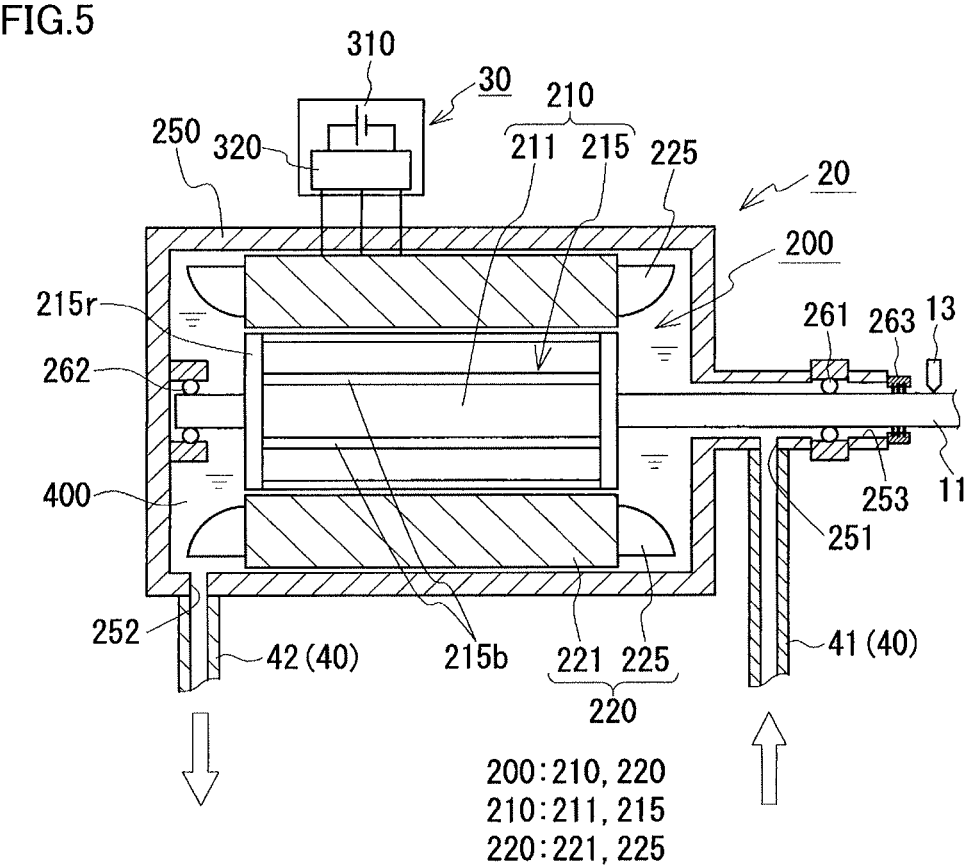
FIG. 5 is a schematic view showing another example of a configuration of a heat generator in a second embodiment.

In the first embodiment, description has been given to the configuration in which magnetic field control means 30 applies the direct current to armature winding 225. However, in a second embodiment, such a configuration will be described with reference to FIG. 5 that magnetic field control means 30 applies, to armature winding 225, an alternating current having a frequency that produces the stalling torque. Except that the configuration of magnetic field control means 30 is different, the configuration of heat generator 20 is the same as that of the first embodiment described with reference to FIG. 2. Therefore, the difference will be mainly described below.

Magnetic field control means 30 includes power supply 310 and an inverter 320, and is configured to apply the alternating current from power supply 310 through inverter 320 to armature winding 225. Specifically, magnetic field control means 30 is configured to generate a three-phase alternating current having a prescribed frequency at inverter 320 and apply the three-phase alternating current to armature winding 225 so as to result in slip that produces the stalling torque.

The principle of induction motor 200 operating as a heat generator in this case will be described. For example, when magnetic field control means 30 applies, to armature winding 225, the alternating current having the frequency that produces the stalling torque in the case where field (rotor) 210 is rotating at the rated rotational speed (the rated number of rotations) due to rotation of a wind turbine 110, the same amount of load torque as the amount of stalling torque is produced. Then, an induced current flows through field conductor 215 of field 210 and a workload (output) thereof is consumed as heat generation by field conductor 215. As described above with reference to FIG. 7, the stalling torque is generally further larger than the rated torque and the starting torque, and thus, the workload (output) that is further larger than the rated output of induction motor 200 can be obtained and an amount of heat generation is further larger.

(First Modification: Field=Stator (Outer Side), Armature=Rotor (Inner Side))

In the aforementioned first and second embodiments, description has been given to the configuration in which field 210 serves as a rotor and armature 220 serves as a stator in induction motor 200 (revolving field type). Further using this technique of induction motor 200, the induction motor can also have a configuration in which the positional relationship between field 210 and armature 220 is reversed such that field 210 serves as a stator and armature 220 serves as a rotor (revolving armature type).

Figure 6:
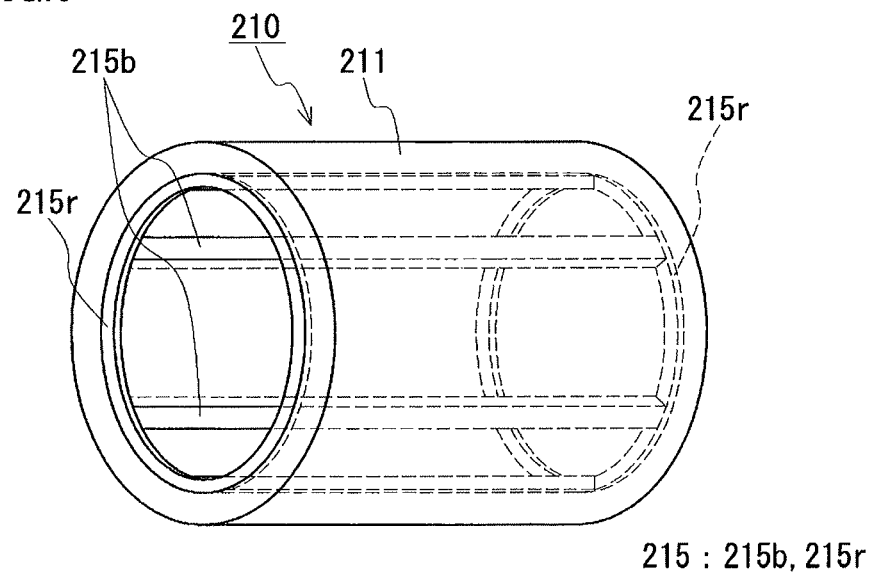
FIG. 6 is a schematic view showing a configuration of a field in a first modification.

For example, as shown in FIG. 6, the field (stator) may have such a structure that the conductor is arranged in the form of squirrel cage on an inner circumference of cylindrically-shaped field core 211 and this squirrel-cage conductor forms field conductor 215. This squirrel-cage conductor (field conductor 215) is formed by embedding conductor bars 215b in multiple slots spaced apart from one another and provided in the inner circumference of field core 211, and providing, at opposing ends of field core 211, conductor end rings 215r for short-circuiting these conductor bars 215b. On the other hand, the armature (rotor) is arranged on the inner side of field 210 with a spacing therebetween, and is coupled to the rotation shaft of the wind turbine. Specifically, the armature may have such a structure that the armature core is coupled to the rotation shaft of the wind turbine and the armature winding is wound around the salient pole of the armature core protruding outwardly toward the field. Similarly to the first embodiment, the armature winding is wound in the form of, for example, three-phase distributed winding. In addition, the excitation current (input current) is supplied from the magnetic field control means to the armature winding through a slip ring.

Even with such a configuration, by using the magnetic field control means to control the input current to the armature winding so as to result in slip that produces the load torque during rotation of the rotor (here, armature) due to rotation of the wind turbine, the induced current corresponding to the load torque flows through the field conductor of the field and the field conductor generates heat. For example, similarly to the first embodiment, when the magnetic field control means applies the direct current to the armature winding in the case where the armature (rotor) is rotating at the rated rotational speed (the rated number of rotations) due to rotation of the wind turbine, the same amount of load torque as the amount of starting torque is produced and the workload (output) thereof is consumed as heat generation by the field conductor. Alternatively, similarly to the second embodiment, when the magnetic field control means applies, to the armature winding, the alternating current having the frequency that produces the stalling torque, the same amount of load toque as the amount of stalling torque is produced and the workload (output) thereof is consumed as heat generation by the field conductor.

In addition, with this configuration, the field that generates heat is the stator, and thus, such a configuration is also possible that the induction motor is not housed in the heat insulating container. Specifically, a heating medium flow path is provided by forming, in the field, a hole through which the heating medium circulates or arranging, on the outer circumferential surface of the field, a pipe through which the heating medium circulates, and this heating medium flow path forms the heating medium circulation mechanism, and thus, the heat generated by the induction motor (field) can be transferred to the heating medium. In this case, the heat insulating container can be omitted, and thus, the heat generator can be reduced in size.

(Second Modification: Field=Stator (Inner Side), Armature=Rotor (Outer Side))

In the aforementioned first and second embodiments, description has been given to the configuration in which the rotor (field 210) is arranged on the inner side of the stator (armature 220) in induction motor 200 (inner rotor type). Further using this technique of induction motor 200, the induction motor can also have a configuration in which the positional relationship between field 210 and armature 220 is not changed such that field 210 serves as a stator and armature 220 serves as a rotor, and the rotor (armature 220) is arranged on the outer side of the stator (field 210) (outer rotor type).

For example, the armature core may be coupled to the rotation shaft such that the armature rotates in conjunction with the rotation shaft of the wind turbine, and the field (field core) may be cantilevered and fixed to the housing such as the heat insulating container. In this case, the excitation current (input current) is supplied from the magnetic field control means to the armature winding through the slip ring.

(Third Modification: Field=Rotor (Outer Side), Armature=Stator (Inner Side))

Similarly to the second modification, the induction motor of the aforementioned first modification can also have a configuration in which the armature serves as a stator and the field serves as a rotor, and the rotor (field) is arranged on the outer side of the stator (armature) (outer rotor type).

In the wind-powered thermal power generation system according to the present invention described above, the heat generator which is a component is formed by using the technique of the induction motor, and thus, the heat generator can be formed inexpensively and simply. In addition, when the induction motor having the same workload (output) as that of the conventional power generator (motor) is used as the heat generator, the heat generator can be reduced in size and weight as compared with the power generator.

The present invention is not limited to the aforementioned embodiments and can be modified as appropriate without departing from the gist of the invention. For example, in the case of the configuration in which the heat insulating container that houses the induction motor is provided and the heating medium is circulated inside the heat insulating container, the heat exchange efficiency between field 210 and heating medium 400 can be enhanced by providing projections and depressions or a fin on the surface of field core 211 to increase a surface area of field 210. In addition, it is desired that the loss (heat generation) of the heat generator should be large unlike the common power generator (motor). Therefore, field conductor 215 may be made of more inexpensive metal (e.g., iron), in addition to copper or aluminum. Field core 211 may also be made of more inexpensive iron, in addition to formation by stacking silicon steel plates, or staking is not indispensable.

The wind-powered thermal power generation system according to the present invention can be suitably used in the field of power generation using renewable energy.

REFERENCE SIGNS LIST 1 wind-powered thermal power generation system; 10 wind turbine; 11 rotation shaft; 12 blade; 13 rotation detector; 20 heat generator; 200 induction motor; 210 field; 211 field core; 215 field conductor; 215b conductor bar; 215r conductor end ring; 220 armature; 221 armature core; 225 armature winding; 250 heat insulating container; 251 inlet; 252 outlet; 253 shaft insertion port; 261, 262 bearing; 263 shaft seal portion; 30 magnetic field control means; 310 power supply; 320 inverter; 40 heating medium circulation mechanism; 400 heating medium; 41 supply pipe; 42 discharge pipe; 43 circulating pump; 50 heat exchanger; 51 first heat exchange pipe; 52 second heat exchange pipe; 60 power generation portion; 61 steam turbine; 62 power generator; 71 condenser; 72 circulating pump; 91 tower; 92 nacelle; 93 building.

The invention claimed is:

1. A wind-powered thermal power generation system, comprising:
    a wind turbine;
    an induction motor including a field which has a field core and a field conductor arranged therearound, and an armature which has an armature core provided with a salient pole facing the field and an armature winding of three phases wound around the salient pole, and configured such that one of the field and the armature serves as a rotor coupled to a rotation shaft of said wind turbine, and the other serves as a stator;
    magnetic field control means for applying a direct current to at least two phases of armature windings among the three phases when said rotor is rotating in conjunction with said rotation shaft as a result of said wind turbine concurrently being rotated by wind,
    wherein said magnetic field control means applying the direct current to the at least two phases of armature windings when the wind turbine is being rotated by wind causes slip that forcibly provides load torque to said rotor rotating in conjunction with said rotation shaft that is larger than a rated torque of said induction motor,
    wherein said magnetic field control means applying the direct current to the at least two phases of armature windings causes a rotational speed of said rotor to become smaller than a rated rotational speed of the induction motor at a time when the wind turbine is being rotated by wind, and
    wherein said magnetic field control means applying the direct current to the at least two phases of armature windings when the wind turbine is being rotated by wind causes an induced current corresponding to the load torque to flow through the field conductor of the field, which in turn causes heat to be generated by the induction motor;
    a heating medium circulation mechanism for circulating a heating medium that receives heat generated by said induction motor, wherein the heating medium and circulation thereof are configured to prevent heat damage to said field conductor and said armature winding, while at the same time storing at least a portion of the heat generated by the induction motor; and
    a power generation portion for converting, into electricity, the heat of said heating medium generated by said induction motor.

2. The wind-powered thermal power generation system according to claim 1, further comprising
    a heat insulating container that houses said induction motor, wherein
    said heating medium circulation mechanism circulates said heating medium inside said heat insulating container.

3. A wind-powered thermal power generation system, comprising:
    a wind turbine;
    an induction motor including a field which has a field core and a field conductor arranged therearound, and an armature which has an armature core provided with a salient pole facing the field and an armature winding wound around the salient pole, and configured such that one of the field and the armature serves as a rotor coupled to a rotation shaft of said wind turbine, and the other serves as a stator;
    magnetic field control means having a power supply for applying to said armature winding, an alternating current having a frequency that produces stalling torque greater than a rated torque of said induction motor when said rotor is rotating in conjunction with said rotation shaft as a result of said wind turbine concurrently being rotated by wind,
    wherein said magnetic field control means applying the alternating current to the armature winding when the wind turbine is being rotated by wind causes slip that forcibly provides load torque to said rotor rotating in conjunction with said rotation shaft that is greater than the rated torque of said induction motor,
    wherein said magnetic field control means applying the alternating current to armature winding causes a rotational speed of said rotor to become smaller than a rated rotational speed of the induction motor at a time when the wind turbine is being rotated by wind, and
    wherein said magnetic field control means applying the alternating current to the armature winding when the wind turbine is being rotated by wind causes an induced current corresponding to the load torque to flow through the field conductor of the field, which in turn causes heat to be generated by the induction motor;
    a heating medium circulation mechanism for circulating a heating medium that receives heat generated by said induction motor, wherein the heating medium and circulation thereof are configured to prevent heat damage to said field conductor and said armature winding, while at the same time storing at least a portion of the heat generated by the induction motor; and
    a power generation portion for converting, into electricity, the heat of said heating medium generated by said induction motor.

* * * * *